United States Patent [19]

Berry et al.

[11] 4,031,267

[45] June 21, 1977

[54] EXPANDED PROTEIN PRODUCT AND METHOD OF MAKING SAME

[75] Inventors: Martin F. Berry; Stanley H. Reesman; Marvin L. Smith, all of Battle Creek; Peter Van Middlesworth, Climax, all of Mich.

[73] Assignee: General Foods Corporation, White Plains, N.Y.

[22] Filed: Aug. 25, 1975

[21] Appl. No.: 607,416

Related U.S. Application Data

[63] Continuation of Ser. No. 211,758, Dec. 23, 1971, abandoned.

[52] U.S. Cl. .............................. 426/656; 426/657; 426/658; 426/802
[51] Int. Cl.² .......................................... A23J 3/00
[58] Field of Search .......... 426/641, 656, 802, 646, 426/657, 601, 608, 658

[56] References Cited

UNITED STATES PATENTS

| | | | |
|---|---|---|---|
| 3,496,858 | 2/1970 | Jenkins | 426/802 X |
| 3,623,885 | 11/1971 | Hamdy | 426/656 X |

*Primary Examiner*—Raymond N. Jones
*Assistant Examiner*—Esther L. Massung
*Attorney, Agent, or Firm*—Thaddius J. Carvis; Bruno P. Struzzi

[57] ABSTRACT

An expanded protein product is made by extruding, preferably following heating and working, a mix containing a proteinaceous material, an animal or vegetable fat, a non-proteinaceous and non-farinaceous filler, sulfur and/or a sulfur compound, and water from a high pressure zone to a low pressure zone.

21 Claims, No Drawings

EXPANDED PROTEIN PRODUCT AND METHOD OF MAKING SAME

This is a continuation, of application Ser. No. 211,758, filed Dec. 23, 1971 now abandoned.

BACKGROUND OF THE INVENTION

The present invention is concerned with the production of porous hydratable protein food products having a texture and appearance similar to the muscle and tissue protein found in meats or fowl. More particularly this invention relates to a method for producing a fat containing expanded proteinaceous composition by working and heat extrusion of a mixture of proteinaceous material, fat, a non-proteinaceous and non-farinaceous filler, and sulfur and/or a sulfur compound.

There is a major effort in the world today to produce nutritious, high protein meat substitute products for both animal and human consumption. A significant effort has been directed toward the utilization of protein flours and meals derived from oil seed such as soy beans, peanuts, cottonseeds, and the like as raw materials in the production of said products. Recent developments in this area have focused on the production of meat-like protein products produced by extrusion or otherwise heat treating soy protein. For example, U.S. Pat. No. 3,537,859 discloses a method for preparing protein food products simulating bacon in texture by extruding a homogeneous mixture of defatted soy meal, fat, water and flavoring. The extrudate is characterized as non-expanded and contains entrained moisture of fat. U.S. Pat. No. 3,488,770 deals with a method for preparing an expanded porous protein food product having an open cell structure wherein a mixture comprising defatted soy meal and water is masticated at temperatures above about 250° F and extruded from a zone of high pressure into a zone of lower pressure. The product is characterized as having a meat-like fibrous structure when hydrated. U.S. Pat. No. 3,496,858 discloses the preparation of an expanded protein product similar to the above except sulfur or a sulfur compound is added to the defatted soy meal prior to extrusion. These sulfur additives chemically interact with the protein molecules during processing giving rise to an extrudate having a high degree of expansion and very desirable fibrous structure.

Protein processed according to the teachings of the latter two patents discussed above does indeed have a texture and fibrous structure closely resembling meat. However, most meat products such as beef, poultry, lamp and pork contain a fat content varying from about 5 to 30% or more depending on the type and cut of meat. Much of this fat remains in the meat even after cooking and it is this fat which contributes to the smooth texture, nutrition, juicyness and pleasing organoleptic qualities associated with good quality cooked meats. Thus, it would be most desirable to produce a simulated meat product based on expanded proteinaceous materials which contains a certain amount of fat or oil in intimate association with the fibrous protein structure of the expanded protein.

Prior art workers have discovered that the presence of significant amounts of a fat or oil in the proteinaceous material to be extruded severely interferes with expansion of the extrudate and the formation of a fibrous structure. As a result, it is recommended that the protein material be substantially free of oil and that no fat be added to the proteinaceous material prior to extrusion.

It has been suggested by the prior art that fat or oil may be combined with the expanded proteinaceous meat substitute after extrusion by coating, impregnating or otherwise infusing the material with a liquid fat. Note, for example, British Pat. No. 1,225,557. However, it is most difficult by such techniques to obtain the intimate association of protein and carbohydrate as is found in real meat products, and the fat will often settle out within short periods of time severly detracting from product palatability.

SUMMARY OF THE INVENTION

It has now been found that an expanded protein product containing up to about 35% by dry weight of a fat or oil can be prepared by forming a mixture comprising a proteinaceous material, fat or oil, and minor amounts of a finely divided non-proteinaceous and non-farinaceous filler material, hereinafter referred to simply as filler material. The expanded product having a meat-like texture is prepared by subjecting the mix to heat and mechanical working such as in a cooker-extruder, and extruding the composition from a zone of higher pressure into a zone of lower pressure.

As indicated hereinabove, it had previously been the experience of prior art workers that the presence of significant amounts of a fat or oil in a proteinaceous composition prior to extrusion severly inhibits the expansion and texturization of the protein such that a porous product having a meat like texture when hydrated cannot be prepared. By means of the present invention it is now possible to prepare expanded protein product containing significant amounts of a fat or oil in intimate association with the protein molecules, which product not only texturally resembles meat on hydration, but also has a smoother, moist fatty feed inherent in genuine meat products.

DETAILED DESCRIPTION

The expanded product is achieved in the preferred embodiment by processing a mixture comprising a high proteinaceous material, fat or oil, filler material, sulfur and/or a sulfur compound and water through an extruder. The mix is heated and worked so as to obtain a temperature of above 220° F prior to discharge from a high pressure zone to a lower pressure zone. The amount of water used will be sufficient to facilitate processing and yield an extrudate having a moisture content of about 15 to 40%. It is preferred to reach a temperature of at least about 250° F prior to discharge, with temperatures of 280° F to 320° F being even more preferred. The upper limit of temperature is determined by the temperature at which the ingredients may undergo undesirable quality degredation.

In preparing the product of this invention, the ingredients may be blended prior to introduction into the extruder or in the extruder itself. The mix, as it is moved progressively foreward in the extruder will be subject to shear forces, mechanical work, heat and pressure such that the product temperature prior to discharge is at least 220° F. The pressure and some of the heat is generated as a result of the progressive advancement of the product in the extruder screw chamber against a restricted orifice at the discharge section of the chamber and also by internal frictional forces. Pressure and temperature can be varied by altering the screw configuration, screw speed, the size of the die plate and orifice at the discharge point or by applying an external heat source as with a steam jacketed extruder.

The proteinaceous material used may be any high protein material derived from a vegetable or animal source or mixtures of several different proteinaceous materials. High protein means at least 30% by weight of the material is protein inasmuch as it has been found that this minimal level is necessary to obtain the desired degree of texture and expansion. Protein concentrates and isolates may be employed. It has been found that with soy flour and soy meal, optimum expansion is achieved at a protein content of about 40% to 75% by weight. Wheat gluten with a protein content of about 80% has been successfully used. Protein materials derived from vegetable sources other than soy beans such as peanuts, cottonseeds and the like, as well as corn gluten, meat and fish meals and casein can be used.

The fat or oil present in the expanded protein product, hereinafter referred to as fatty glyceride, may be the fat or oil which is naturally present in the proteinaceous material, or it may be foreign to the proteinaceous material as will be hereinafter described. Examples of such fatty glycerides are vegetable oils such as cottonseed oil, soybean oil, peanut oil, coconut oil and the like and animal fats such as tallow, lard, chicken fat, fish oil and the like.

Filler materials used in the present invention include those non-proteinaceous and non-farinacious finely divided materials which function so as to bind up any fatty glyceride material present in the composition. To be effective, the filler should be insoluble or difficulty soluble in water and the particular fatty glyceride with which it is used. It should be finely divided such that as great a surface area as possible is provided. Although the mechanism of the interaction between the fatty glyceride and the filler is not fully understood, it appears that the filler ties up or binds up the fatty glyceride such that it is unavailable to interfere with the expansion and texturization of the protein as it leaves the extruder. It also appears that the filler exhibits a reinforcing action on the proteinaceous material as will be hereinafter described. Preferred are those filler materials which exhibit a greater attraction for fatty glyceride than for water. Examples of non-proteinaceous and non-farinaceous fillers suitable for the purposes of this invention are silicone dioxide, silicic acid, cellulose floc or fiber, microcrystalline cellulose metal silicates or silicoaluminates, carbon black and mixtures thereof. Farinaceous fillers such as wheat flour or cereal in general are incapable of sufficiently binding the fatty glyceride during processing; proteinaceous filler such as finely ground caseinate is also unsatisfactory for this reason. However, these materials may be used in combination with the preferred non-proteinaceous and non-farinaceous fillers of this invention as hereinafter described.

The particle size of the fillers employed will vary depending on the type of filler. Silicon dioxide which may be in the form of pyrogenic silia or precipitated silica has an average particle size preferably within the range of 0.001 to 1 micron, the preferred average particle size being about 0.015 micron. Examples of suitable materials are those marketed under the trade names "Cab-O-Sil" or "Hi-Sil." Silicic acid or silica gel, which are generally prepared by reacting sulfuric acid and sodium silicate, have a particle size ranging from about 0.001 to 10 microns. Suitable silicic acid is that sold under the trade name Syloid, i.e., Syloids 63, 65, 72, 73, and 74. Cellulose materials found useful as fillers include materials sold under the trade name "Solka-Floc" which is a fibrous, finely divided material produced from purified wood cellulose. This material has an average particle size ranging from about 35 to 165 microns. Microcrystalline cellulose which is generally produced by acid hydrolysis of cellulosic material, has an average particle size within range of about 0.01 to about 50 microns. Typical of such material is that sold under the trade name "Avicel." Silicates employed as fillers have an average particle size range of about 0.5 to 50 microns. Preferred silicates are magnesium silicate, magnesium trisilicate and the alkali or alkaline earth metal silicates or silicoaluminates such as sodium or calcium silicate and silicoaluminate. These materials are commercially available under the tradenames Microcel and Celkate. The carbon blacks should have an average particle size of about 0.2 to 1 micron. In general, the average particle size of the fillers employed may range from about 0.001 to 200 microns.

The degree of expansion and texturization of the proteinaceous material of this invention is affected by the choice and amount of filler and the amount of fatty glyceride present in the composition. The amount of fatty glyceride present in the composition may range from less than about 0.1% to about 35% by dry weight, and the amount of non-proteinaceous and non-farinaceous filler used may range from about 0.1 to about 20% by dry weight. Where the amount of fatty glyceride is significantly higher than about 35% by weight of the composition to be extruded, expansion and texturization is markedly inhibited. Preferably, the filler is used within the range of 1 to 15% by weight of the composition. The amount of filler used based on fat content of the composition will depend on the degree of adsorbtivity of the filler. In general, 1 part of filler per 1-10 parts of fatty glyceride is suitable. In the case of silicon dioxide and cellulose fillers, it is preferred to use 1 part of filler per 1 to 7 parts of fatty glyceride. Generally speaking, the amount of filler required increases proportionately with the amount of fatty glyceride present in the composition.

The proteinaceous source material need not be defatted or de-oiled prior to extrusion. For example, vegetable seed material such as full fat soy meal or flour which contains about 22% by weight soy bean oil may be simply admixed with the filler and other ingredients are extruded. Better results in terms of expansion and texturization are obtained if the mixture of full fat soy and filler are permitted to stand at ambient conditions for a period of 30 minutes to 20 hours, but this step is not necessary. As indicated above, satisfactory results are achieved where the filler and soy meal are mixed in the extruder.

In applications, where the expanded vegetable protein material is intended as a meat substitute or extender, it may be desirable for flavor and nutritional purposes to remove some or all of the vegetable oil prior to extrusion by solvent extraction, pressing or other techniques, and replace the oil with an animal fat such as tallow or lard. For example, expanded soy containing 10%, 20% or 35% tallow may be prepared by thoroughly blending de-oiled soy meal with the appropriate amount of tallow in a ribbon mixer or other suitable device, further thoroughly blending this mixture with filler, sulfur or sulfur compound and any other ingredients which are to be included in the composition, and extruding the composition in the manner hereinabove described. Other protein source material such as peanuts, cottonseeds, meat meal, fish meal and the like may be similarly de-oiled and the oil replaced with any animal or vegetable fat desired. This is a particularly advantageous procedure where it is desired to replace saturated fats found in meat protein with unsaturated vegetable oil.

It has been found that the filler materials used in the present invention also tend to reinforce the proteinaceous product such that a more rigid and more uniformly expanded extrudate will issue from the extruder. It is not known whether or not the filler interacts with the protein and sulfur during processing or simply acts as a catalyst for the protein/sulfur interaction, but in any event, tougher more uniformly expanded products are obtained even when the extrudate contains substantially no fat or oil, i.e., less than 1%. Thus the fillers used in preparing the expanded proteinaceous material of the present invention serve a dual purpose. First, to bind up any fatty glyceride present in and/or added to the proteinaceous material prior to extrusion thereby permitting the formation of a porous, expanded and texturized proteinaceous material containing more than 5% and up to about 35% by dry weight of fatty glyceride based on the final product, and secondly, to aid in the formation of more uniformly expanded extrudates where the expanded proteinaceous material contains little or no fatty glyceride, i.e., less than about 5%.

The amount of sulfur or sulfur compound employed in preparing the expanded proteinaceous material will vary depending upon the amount of protein present in the source material, the nature of the sulfur compound and the degree of expansion desired. In general, sulfur or sulfur compounds may be added in the range of 0.01 to 2.5% by weight of the composition to be extruded. Preferred levels range from 0.1 to 0.6% by weight. Typical sulfur containing materials which aid in the preparation of the expanded porous proteinaceous material of this invention are elemental sulfur, alkali metal sulfites, bisulfites, metabisulfites and the like, and organic sulfur compounds such as cysteine, cystine, methionine, lower alkyl mercaptans and the like.

In addition to proteinaceous source material, filler, fatty glyceride, and sulfur or sulfur compound, other ingredients may be added to the proteinaceous compositions of this invention for the purposes of nutrition, flavoring and preservation. Farinaceous materials such as wheat, rice or corn flour, and modified and unmodified starches may be employed up to a level of about 25% by weight of the composition as bulking or nutritive agents without seriously interfering with the preparation of an expanded product. Where the proteinaceous source material is a vegetable protein such as soy meal, it is sometimes desirable to blend the soy meal with minor amounts of other protein materials such as wheat gluten, caseinate, whey, gelatin and the like for nutritional purposes. Salt and other flavorings may also be added to suit taste.

The expanded product of this invention is ideally suited as a partial or total replacement for meat in a multitude of products such as soups or stews, chili-con-carni, animal food and the like. Due to the porous nature of the product it is capable of absorbing many times its weight of water. When rehydrated, it has the fibrous appearance of meat as well as the fatty feel and smooth texture of meat due to the intimate association of fatty glyceride with the protein fibers. The expanded product may be diced into small pieces and mixed with meat or meat by-products for use as an animal food. The expanded product may be infused with liquids containing flavorings, preservatives such as sugar or edible glycols, colorants and the like to provide a simulated meat product.

The following examples are illustrative of the preferred methods for preparing the expanded products of this invention. It should be kept in mind that methods other than extrusion such as mechanical milling or pressing which impart the mechanical work, pressure and temperature necessary for the production of an expanded proteinaceous composition may be employed.

EXAMPLE I

The following formulations were prepared for extrusion:

| Ingredient | | No. 1 | No. 2 | No. 3 |
|---|---|---|---|---|
| Full Fat Soy Flour (22% oil) | | 92.75% | 77.75% | 97.75% |
| Silicon Dioxide (Cab-O-Sil M-5) | | 5.00% | 5.00% | — |
| Salt | | 2.00% | 2.00% | 2.00% |
| Elemental Sulfur | | 0.25% | 0.25% | 0.25% |
| Wheat flour (Seal of Minn.) | | — | 15.00% | — |
| | Total | 100.00% | 100.00% | 100.00% |

Mixtures No. 1 and No. 2 were prepared by thoroughly mixing the full fat soy flour (22% oil) and the silicon dioxide in a ribbon mixer. These mixtures were permitted to stand at ambient conditions for a period of about two hours. The remaining ingredients were then added to the soy/silicon dioxide mixture and the ingredients mixed in the ribbon mixer for an additional eight minutes.

Mixture No. 3 which contains no silicon dioxide filler was prepared by mixing the soy flour, sulfur and salt for a period of eight minutes in a ribbon mixer.

Each of these mixtures was then fed into a Wenger X-25 extruder at the rate of about 400 lbs. per hour along with a stream of water sufficient to produce an extrudate having a moisture content of about 25% to 30%. The extruder was equipped with a deep flite screw and the cone screw near the exit end of the extruder was of cut flite design. The extruder was also equipped with steam jackets and approximately 60 psig steam was used during extrusion. Each of these mixtures was subject to mechanical working and cooking while advancing toward the die head of the extruder. The mixtures at a product temperature of about 290° F were extruded through a circular die opening 11/32 inch in diameter and discharged into the atmosphere.

Mixtures No. 1 and No. 2 extruded into expanded ropes about three times the size of the die opening exhibiting excellent fibrous structure and meat-like texture. Expansion was relatively uniform throughout. Upon rehydration, these ropes exhibited a fatty feel due to the presence of the soy bean oil in intimate association with the proteinaceous fiber.

Mixture No. 3 did not form an expanded rope when extruded, but rather issued as clumps of a dense dough-like mass. Very little fibrous texturization was obtained. In addition, a small amount of soy beam oil was detected streaming out of the extruder die orifice. It appears that this oil was squeezed out of the soy flour during processing.

EXAMPLE II

This example illustrates the preparation of expanded, texturized protein from solvent extracted soy meal with added tallow. The following mixtures were prepared:

| Ingredient | No. 4 | No. 5 |
| --- | --- | --- |
| Ground Soybean Oilmeal (less than 1% oil) | 66.09% | 54.42% |
| Wheat Flour | 15.00% | 15.00% |
| Tallow | 11.66% | 23.33% |
| Salt | 2.00% | 2.00% |
| Sulfur (Crude) | 0.25% | 0.25% |
| Silicon Dioxide (Cab-O-Sil M-5) | 5.00% | 5.00% |
| Total | 100.00% | 100.00% |

Each mixture was prepared by first forming an intimate mixture of the tallow and the soy meal in a ribbon mixer. All of the remaining ingredients including the silicon dioxide were then added to the soy/tallow mixture and mixing continued for about eight minutes.

Each of these mixtures was then extruded in a Wenger X-25 extruder under the same conditions in Example I. In each case the extrudate issued as a uniformly expanded and fibrous rope which resembled meat in texture, particularly when hydrated. The expanded rope produced from mixture No. 4 had an overall fat content of about 12% on a dry weight basis and the rope produced from mixture No. 5 an overall fat content of about 24%, also on a dry weight basis.

EXAMPLE III

This example illustrates the preparation of extruded protein from solvent extracted soy meal with added tallow using cellulose and calcium silicate as filler materials, and also using no non-proteinaceous or non-farinaceous filler whatsoever.

| Ingredient | No. 6 | No. 7 | No. 8 |
| --- | --- | --- | --- |
| Ground Soybean Oilmeal (less than 1% oil) | 59.62% | 59.62% | 64.62% |
| Wheat Flour | 15.00% | 15.00% | 15.00% |
| Wheat Gluten | 10.00% | 10.00% | 10.00% |
| Tallow | 8.13% | 8.13% | 8.13% |
| Sulfur | 0.25% | 0.25% | 0.25% |
| Salt | 2.00% | 2.00% | 2.00% |
| Cellulose Fibers (Solka Floc) | 5.00% | — | — |
| Calcium Silicate (Micro-Cel) | — | 5.00% | — |
| Total | 100.00% | 100.00% | 100.00% |

These mixtures were prepared and extruded as in Example II except that a shallow flite extrusion screw was employed, the dry mix feed rate was about 300 lbs/hr. and the amount of water employed was about 40 lbs/hr. The mixtures were extruded through a 1⅜ inch circular die.

Extruded ropes prepared from mixtures No. 6 and No. 7 showed good expansion and texturization. Each of these ropes had a total fat content of almost 9% on a dry weight basis. Mixture No. 8 could not be extruded into the form of an expanded rope. Fat was detected streaming from the die orifice during extrusion.

EXAMPLE IV

This example illustrates the preparation of a soft moist pet food by allowing 20% expanded protein chunks to soak up an 80% preserved meat slurry.

The meat slurry is prepared by placing the following ingredients in an agitated steam jacketed kettle and cooking for 15–30 minutes at 200° F.

| | % by Weight |
| --- | --- |
| Ground Beef Trimmings | 47.50 |
| Propylene Glycol | 2.50 |
| Salt | 2.50 |
| Phosphoric Acid | 1.00 |
| Emulsifier | 1.25 |
| Potassium Sorbate | 0.50 |
| Vitamins and Minerals | 2.00 |
| Sugar | 27.50 |
| Color | 0.02 |
| Water | 15.23 |

Expanded protein ropes prepared from mixture No. 4 in Example II were diced into ¼ inch pieces and dried to a moisture content of about 12%. These chunks were then mixed with the meat slurry for about five minutes until all free liquid was absorbed. The product was cooled to 70° F and packaged in a moisture impermeable wrapper. The product showed bacteriological stability for a period of at least six months.

What we claim is:

1. An edible protein product comprising an expanded proteinaceous material, said product having an open, cellular, fibrous structure and a fatty glyceride content of more than 5% and up to about 35% by dry weight and prepared by heat processing and mechanically working a composition containing an admixture of a proteinaceous material having a protein content of at least 30% by weight, from 0 to about 35% by dry weight of added fatty glyceride, between about 0.1 to about 20% by dry weight of a non-proteinaceous and non-farinaceous finely divided filler material capable of binding up fatty glyceride, and 0.01 to 2.5% by weight of sulfur or a sulfur compound, said filler being selected from the group consisting of silicon dioxide, silicic acid, metal silicates or silicoaluminates, carbon black and mixtures thereof.

2. The product of claim 1 wherein the filler comprises silicon dioxide.

3. The product of claim 2 wherein the composition further includes a farinaceous ingredient.

4. A meat containing food product comprising a mixture of meat and the product of claim 3.

5. The product of claim 1 wherein the proteinaceous material has a fatty glyceride content greater than about 5% by weight.

6. The product of claim 5 wherein filler comprises silicon dioxide.

7. The product of claim 1 wherein added fatty glyceride is present at a level more than about 5% by dry weight.

8. The product of claim 1 wherein the filler material is present at a level of one part filler material per 1–10 parts of fatty glyceride.

9. An edible protein product comprising an expanded proteinaceous material, said product having an open, cellular, fibrous structure and a fatty glyceride content of from 8.13% up to about 35% by dry weight and prepared by heat processing and mechanically working a composition containing an admixture of a proteinaceous material having a protein content of at least 30% by weight, from 0 to about 35% by dry weight of added fatty glyceride, between about 0.1 to about 20% by dry weight of a non-proteinaceous and non-farinaceous finely divided filler material capable of binding up fatty glyceride, and 0.01 to 2.5% by weight of sulfur or a sulfur compound, said filler comprising microcrystalline cellulose or cellulose fiber or floc.

10. The product of claim 9 wherein the fatty glyceride content of the product range from 10% to 35%.

11. The product of claim 9 wherein the added fatty glyceride is present at a level of more than about 5% by dry weight.

12. The product of claim 9 wherein the filler material is present at a level of one part filler material per 1–10 parts of fatty glyceride.

13. A method for preparing an expanded edible protein product having an open cellular structure comprising:
   a. forming an admixture containing
      i. a proteinaceous material having a protein content of at least 30% by weight,
      ii. from 0 to about 35% by dry weight of added fatty glyceride,
      iii. between about 0.1 to about 20% by dry weight of a non-proteinaceous and non-farinaceous, finely divided filler material selected from the group consisting of silicon dioxide, silicic acid, metal silicates or silicoaluminates, carbon black, and mixtures thereof, said filler material being capable of binding up fatty glycerides,
      iv. water in an amount sufficient to process said admixture and to produce an expanded product having a moisture content of about 15 to 40%, and
      v. 0.01 to 2.5% by dry weight of sulfur or a sulfur compound, wherein said admixture, the amount of fatty glyceride present in said proteinaceous material or added to said mixture being such that the expanded protein product contains more than 5% and up to about 35% by dry weight of fatty glyceride;
   b. heating the admixture to a temperature of above about 220° F while mechanically working the heated mix at a pressure substantially above atmospheric pressure; and
   c. expanding the mix by suddenly releasing the pressure.

14. The method of claim 13 wherein the admixture is processed continuously through an extruder; the mix being subjected to mechanical working as it is moved from the inlet to the discharge of the extruder; the pressure in said extruder being substantially above atmospheric pressure; the pressure on the mix being released as it is forced through a die head at the discharge end of the extruder into an atmospheric pressure zone.

15. The method of claim 14 wherein the non-aqueous components of the mix are dry blended before they are fed to the extruder.

16. The method of claim 14 wherein the proteinaceous material has a fatty glyceride content of more than 5% by weight.

17. The method of claim 14 wherein fatty glyceride is at a level of more than about 5% by dry weight of the mixture.

18. The method of claim 17 wherein the filler material comprises silicon dioxide.

19. The method of claim 18 wherein said filler material is present at a ratio of one part filler material per 1–10 parts of fatty glyceride.

20. A method for preparing an expanded edible protein product having an open cellular structure comprising:
   a. forming an admixture containing
      i. a proteinaceous material having a protein content of at least 30% by weight,
      ii. from 0 to about 35% by dry weight of added fatty glyceride,
      iii. between about 0.1 to about 20% by dry weight of a non-proteinaceous and non-farinaceous, finely divided filler material comprising microcrystalline cellulose or cellulose fiber or floc, said filler material being capable of binding up fatty glycerides,
      iv. water in an amount sufficient to process said admixture and to produce an expanded protein having a moisture content of about 15 to 40%, and
      v. 0.01 to 2.5% by dry weight of sulfur or a sulfur compound, wherein said admixture, the amount of fatty glyceride present in said proteinaceous material or added to said mixture being such that the expanded protein product contains from 8.13% up to about 35% by dry weight of fatty glyceride;
   b. heating the admixture to a temperature of above about 220° F while mechanically working the heated mix at a pressure substantially above atmospheric pressure; and
   c. expanding the mix by suddenly releasing the pressure.

21. The method of claim 20 wherein in the admixture prepared in step (a), the amount of fatty glyceride present in said proteinaceous material or added to said mixture being such that the expanded protein product contains more than 10% by dry weight of fatty glyceride.

* * * * *

UNITED STATES PATENT AND TRADEMARK OFFICE
CERTIFICATE OF CORRECTION

PATENT NO. : 4,031,267
DATED : June 21, 1977
INVENTOR(S) : Martin F. Berry; Stanley H. Reesman; Marvin L. Smith; Peter Van Middlesworth It is certified that error appears in the above-identified patent and that said Letters Patent are hereby corrected as shown below:

Column 1, line 31, change "of" to --and--

Column 1, line 52, change "lamp" to --lamb--

Column 2, line 37, change "feed" to --feel--

Column 3, line 47, change "silicone" to --silicon--

Column 3, line 60, change "silia" to --silica--

Column 4, line 49, change "are" to --and--

Column 6, line 67, change "beam" to --bean--

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*